United States Patent
Mandelcorn

Patent Number: 5,459,392
Date of Patent: Oct. 17, 1995

[54] UNITY POWER FACTOR POWER SUPPLY WHICH INCLUDES AN ELECTROMAGNETIC INTERFERENCE REDUCTION CIRCUIT

[75] Inventor: Yehoshua Mandelcorn, San Jose, Calif.

[73] Assignee: Megapower Corp., Campbell, Calif.

[21] Appl. No.: 172,934

[22] Filed: Dec. 27, 1993

[51] Int. Cl.⁶ ........................................ G05F 1/10
[52] U.S. Cl. ................................ 323/222; 363/45
[58] Field of Search ........................ 323/207, 210, 323/222, 282; 363/44, 45, 46, 89

[56] References Cited

U.S. PATENT DOCUMENTS

| | | | |
|---|---|---|---|
| 4,536,700 | 8/1985 | Bello et al. | 323/222 |
| 4,677,366 | 6/1987 | Wilkinson et al. | 323/222 |
| 4,855,665 | 8/1989 | Mandelcorn | 323/272 |
| 4,885,675 | 12/1989 | Henze et al. | 363/45 |
| 5,115,185 | 5/1992 | Fraidlin et al. | 323/207 |
| 5,345,375 | 9/1994 | Mohan | 363/40 |

Primary Examiner—Thomas M. Dougherty
Assistant Examiner—Matthew V. Nguyen

[57] ABSTRACT

An electromagnetic interference reduction circuit incorporated into a pulse width modulator in a power factor corrector circuit, and which serves continuously to vary the operating frequency of the width modulated output of the pulse width modulator so that the fundamental component of said output is spread over a relatively wide bandwidth. The frequency of the width modulated output varies continuously in direct proportion to the voltage from a rectified alternating current sine wave voltage source in order to spread the electromagnetic interference in the circuit over a wide bandwidth.

5 Claims, 4 Drawing Sheets

UNITY POWER FACTOR POWER SUPPLY WHICH INCLUDES AN ELECTROMAGNETIC INTERFERENCE REDUCTION CIRCUIT

BACKGROUND OF THE INVENTION

A large number of electronic units require that the alternating current line voltage be converted to a direct current. For that purpose, power supplies in the form of switched converters and inverters have been proposed in the prior art. Such circuits usually involve a large storage capacitor connected across a rectifier bridge output, and this causes the input line current to be highly non-sinusoidal. Accordingly, poor effective power factors are encountered which result in higher input current for a given output of the power supplies.

Specifically, a conventional switched power supply operates as a capacitive load for a rectified line voltage. Such a load draws relatively high currents near the peaks of the alternating current cycle, and substantially zero current for the remainder of the cycle. This results in poor power factor which manifests itself in a larger RMS current for a given input voltage and power load than if the load were purely resistive. A typical prior art switched power supply, for example, draws about 1.5 times the RMS current for a given power output, as compared with a purely resistive load. Consequently, for a given line current the usual prior art switched power supply is capable of delivering only about two-thirds the power which could be delivered if the line current were sinusoidal, which is the case when the load is purely resistive.

A switched mode unity power factor power supply is described in U.S. Pat. No. 4,677,366 which includes a boost converter between a diode rectifier bridge and the storage capacitor included in the power supply. The boost converter is incorporated into the power supply because it draws a relatively smooth current from the power line, and also because it permits the voltage on the storage capacitor to be higher than the voltage produced by the diode rectifier bridge which provides for more efficient energy storage. The boost converter draws a sinusoidal current by operating as a current regulator with a current reference control signal set to track the line voltage waveform to control the voltage across the storage capacitor. The voltage across the storage capacitor is produced by controlling the magnitude of the current reference control signal, but not its wave shape, by a regulating signal. By regulating the voltage across the storage capacitor at a high level, excellent power hold-up time can be achieved when the line power is removed regardless of the input line voltage, with much less storage capacitance being required as compared with the storage capacitance requirements of the previous types of switched power supplies.

The present invention is concerned with a simplified technique and circuit for reducing line conducted electromagnetic interference (EMI) in a pulse-width modulated power factor corrector (PFC) circuit without any need to increase the size of the EMI line filter which is usually incorporated into PFC circuits.

Systems for reducing line conducted electromagnetic interference (EMI) in switched mode power supplies are known to the art. One such system is described, for example, in U.S. Pat. No. 4,712,169 which issued Dec. 8, 1987 in the name of Manfred Albach.

The Albach system and the system of the present invention are similar to one another in that each utilizes the alternating current line voltage to vary the frequency of the switching pulses of a switched mode power supply in order to spread the EMI over a wide spectrum. This procedure is carried out so that the detected EMI may be reduced without having to increase the size of the EMI filter.

However, in the Albach system, the frequency is varied under the control of the alternating current line voltage in a manner such that maximum frequency is achieved at minimum voltage of the AC line, and minimum frequency is achieved at the maximum peaks of the AC line voltage.

Because the frequency in the Albach circuit is a minimum at the voltage peaks, Albach is required to provide complex circuitry including a comparator and a voltage controlled oscillator to achieve the desired reduction in EMI.

The system of the present invention, on the other hand, includes a simple circuit for injecting a current proportional to the instantaneous line voltage into the timing capacitor of a pulse width modulator which is included in the circuit. This connection causes the charging cycle to speed up at the peaks of the line voltage and hence increases the switching frequency at the voltage peaks. When the alternating current line voltage is not at a voltage peak, the speed-up and hence the frequency is less. Thus, the system of the present invention, contrary to the teaching of Albach, provides for the frequency to increase at the peaks of the alternating current line voltage, and to decrease as each cycle of the line voltage decreases.

The system of the present invention, accordingly, preserves the simple control loop and continuous PFC choke current of the pulse width modulator, while giving the noise spreading advantage of varying PFC frequency. Also, the frequency variation in the system of the invention can be tailored to operate at lower frequencies for 115 VAC input where the line current and losses are highest (lower frequency equals lower switch loss); and at higher frequencies at the 230 VAC input where EMI restrictions are tightest but line currents are lower. Higher frequencies require lower inductance and capacitance to perform the appropriate filtering function.

While the frequency variation technique referred to above will be described in conjunction with off-line power factor correctors, it also can be used for downstream DC-to-DC converters that are pulse width modulated to reduce their contribution to the line conducted and/or radiated EMI.

DETAILED DESCRIPTION OF THE ILLUSTRATED EMBODIMENT

Figure 1:
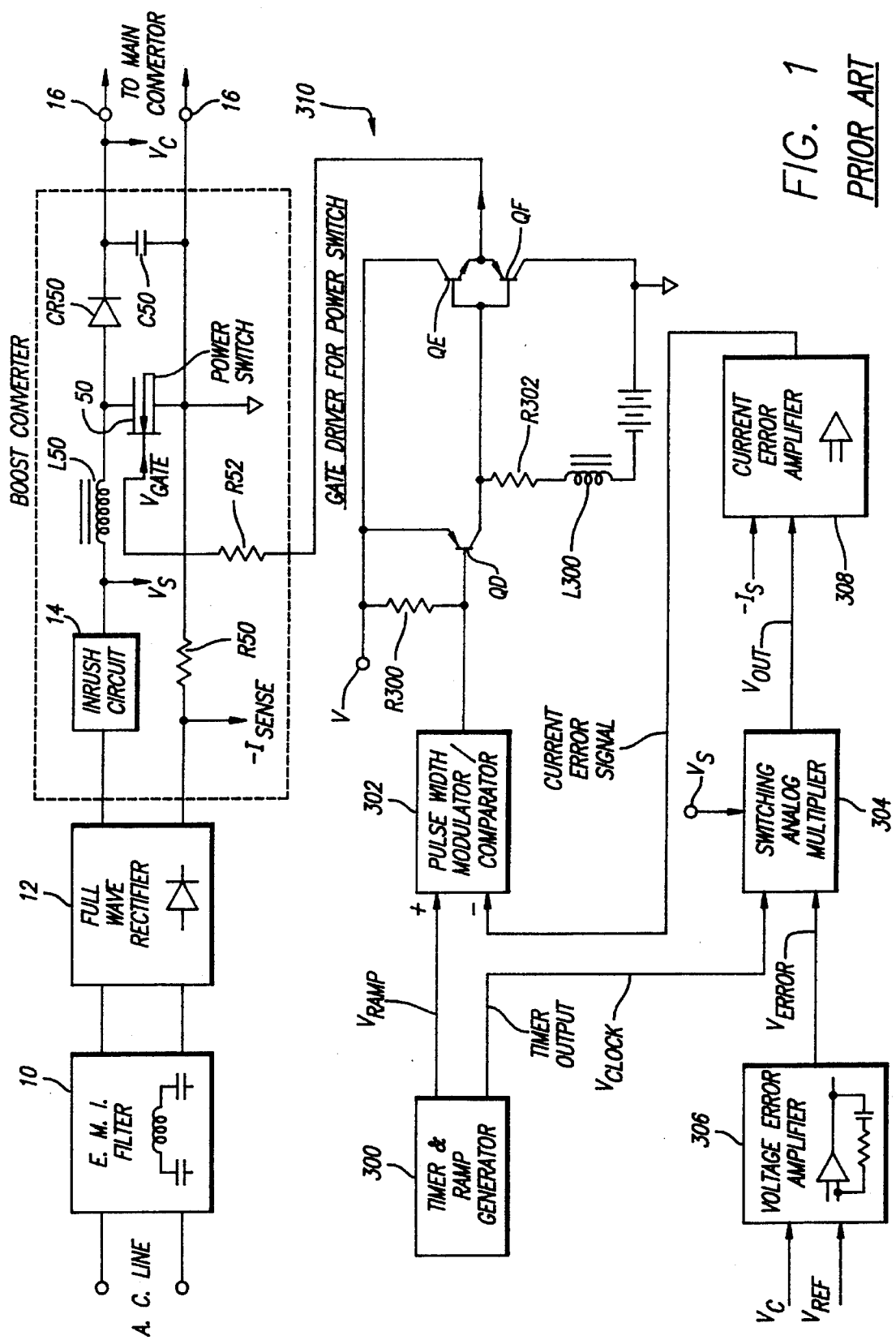
FIG. 1 is a diagram, partly in block form and partly in circuit detail, of a prior art unity power factor power supply, such as described in U.S. Pat. No. 4,677,366.

A fixed frequency pulse width modulator controlled switched unity power factor power supply, of the type described in U.S. Pat. No. 4,677,366 is shown in FIG. 1. The system of FIG. 1 includes line EMI filter 10 which connects the alternating current line to a full wave diode bridge rectifier 12. The fixed frequency pulse width modulator power factor corrector incorporated into the circuit of FIG. 1 has advantages in filtering out EMI in that the continuous choke current produced by the circuit helps reduce EMI and increase efficiency by avoiding large peak currents. However, a disadvantage in the prior art circuit insofar as reducing EMI is concerned is that the entire fundamental frequency component of the PFC ripple must be attenuated by the line EMI filter 10. This results in the necessity for a filter with relatively high filtering requirements. Increasing switching frequency can reduce the filtering requirements of the filter, but at substantial cost increases, increased switching component losses and reduced overall efficiency. A feature of the present invention is that the circuit to be described reduces EMI without any need to increase the size of the EMI line filter 10.

The output of the full wave rectifier 12 in the prior art circuit of FIG. 1 is connected to a boost converter which includes an inrush circuit 14 connected through a choke coil inductance L50 and through a diode CR50 to one of the output terminals 16 of the system, the other output terminal being grounded. The output terminals 16 may be connected to a main switched converter. The prior art circuit of FIG. 1 provides an appropriate control for the main converter so that the main converter draws power at essentially unity power factor from the AC line.

One output terminal of the full wave rectifier 12 is connected to the inrush circuit 14, as described above, and the other output terminal of the full wave rectifier 12 is connected to one terminal of a resistor R50. The other terminal of resistor R50 is grounded. A voltage is developed across resistor R50 representing the current flow ($I_s$) flowing in the boost converter. A capacitor C50 is connected across output terminals 16. A mosfet 50, which functions as a power switch, has its drain and source electrodes connected respectively to the junction of inductance coil L50 and diode CR50, and to ground. A control signal designated $V_{gate}$ is applied to the gate of mosfet 50 so that appropriate controls may be effectuated in order to achieve the desired unity power factor.

FIG. 1 also includes a block diagram of a control system which applies the signal $V_{gate}$ to mosfet 50. The control system includes a timer and ramp generator 300, and it supplies a ramp voltage $V_{ramp}$ to a pulse width modulator/comparator 302. The timer and ramp generator 300 also provide a clock pulse $V_{clock}$ to a switching analog multiplier 304.

Voltage $V_c$ at the ungrounded output terminal 16, and a reference voltage $V_{ref}$, are applied to a voltage error amplifier 306, and the resulting error voltage $V_{error}$ is applied to switching multiplier 304. The voltage $V_s$ at the output of inrush circuit 14 is also applied to multiplier 304. The output $V_{out}$ of the switching multiplier 304 is applied to a current error regulator amplifier 308, as is the negative sense signal $I_s$. The current error signal output of amplifier 308 is applied to the pulse width modulator/comparator 302.

The output of the pulse width modulator/comparator 302 is introduced to the base of a PNP transistor $Q_D$. The emitter of transistor $Q_D$ is connected back to the base through a resistor R300 and to the collector of an NPN transistor $Q_E$. The collector of transistor of $Q_D$ is connected to the base of NPN $Q_E$ and to the base of PNP transistor $Q_F$. The collector of transistor of $Q_D$ is also connected through a resistor of R302 and choke coil L300 to a negative 10v bias source. The collector of transistor $Q_F$ is grounded. The emitters of the transistors $Q_E$ and $Q_F$ supply the voltage $V_{gate}$ to mosfet 50 through a resistor R52. This voltage has a waveform such that the main converter is caused to draw power at essentially unity power factor from the alternating current line. The resistor R300, the emitter of transistor $Q_D$ and the collector of transistor $Q_E$ are all connected to an appropriate voltage source V.

The system of FIG. 1 is described in greater detail in U.S. Pat. No. 4,677,366. In operation of the system, any drop in the output voltage $V_C$ below the reference voltage $V_{ref}$ causes the voltage error amplifier 306 to produce an output voltage $V_{error}$. This output voltage is introduced to the switching analog multiplier where it is multiplied by $$K \cdot \frac{V_{Line\ inst}}{(V_{Line\ rms})^2}$$

The above term is derived in switching analog multiplier 304 from the rectified alternating current voltage $V_s$. The analog multiplier is switched by the constant frequency clock signal $V_{clock}$ derived from the timer and ramp generator 300. The output $V_{out}$ of analog multiplier 304 is proportional to the current reference of the circuit which tracks the line voltage wave form, and it is compared with $-I_s$ in the current regulator amplifier 308 to produce an output representative of the error current. The term $-I_s$ represents the current drawn by the system.

The output from the current regulator amplifier 308 and ramp signal $V_{ramp}$ from the timer and ramp generator 30 are applied to the pulse width modulator in comparator 302 to produce the $V_{gate}$ voltage for mosfet 50. This voltage is in the form of fixed frequency width modulated pulses and represents a switching signal for the boost converter. The switching signal is a function of a regulating signal having a current reference tracked to the line voltage waveform. In this manner, the boost converter is switched under a regulation control, as described above, to provide the desired unity power factor for the power supply.

Figure 3:
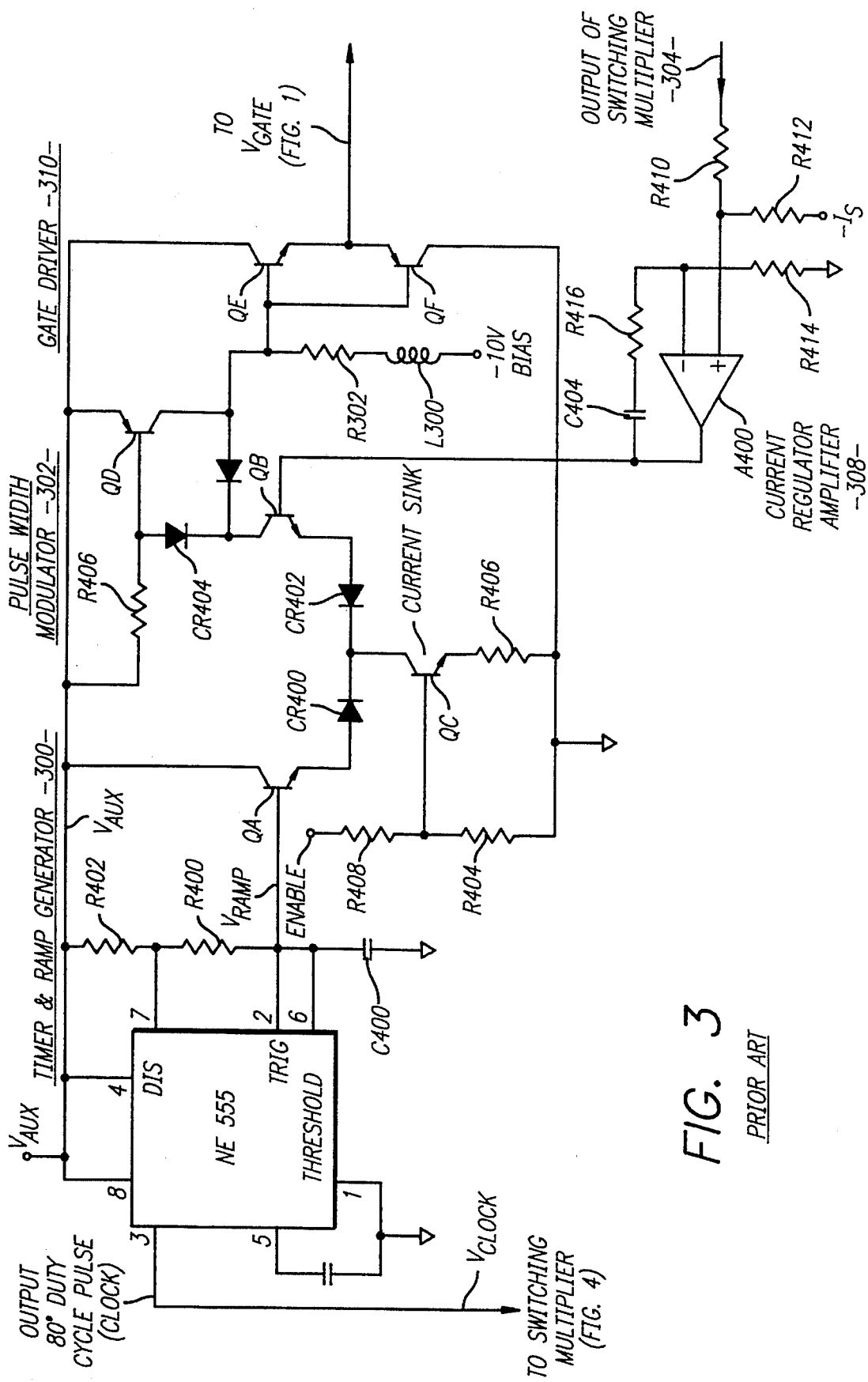
FIG. 3 is a circuit diagram of the components of the prior art circuit of FIG. 1, this circuit diagram being identical to FIG. 5 of U.S. Pat. No. 4,677,366 referred to above.

The timer and ramp generator 300 are shown in circuit detail in FIG. 3, and it includes an integrated circuit of the type designated NE555. The clock pulses $V_{clock}$ appear at terminal 3, and the ramp signal $V_{ramp}$ is generated at terminals 7, 2 and 6. The terminals 2 and 6 are connected to a grounded capacitor C400 having a value of 0.00068 microfarads, and terminal 7 and 2 are connected together through a 2.7 kilo-ohm resistor R400. The terminals 4 and 8 are connected to a voltage source designated $V_{aux}$ and terminal 7 is connected to that source through a 9.53 kilo-ohm resistor R402.

Figure 4:
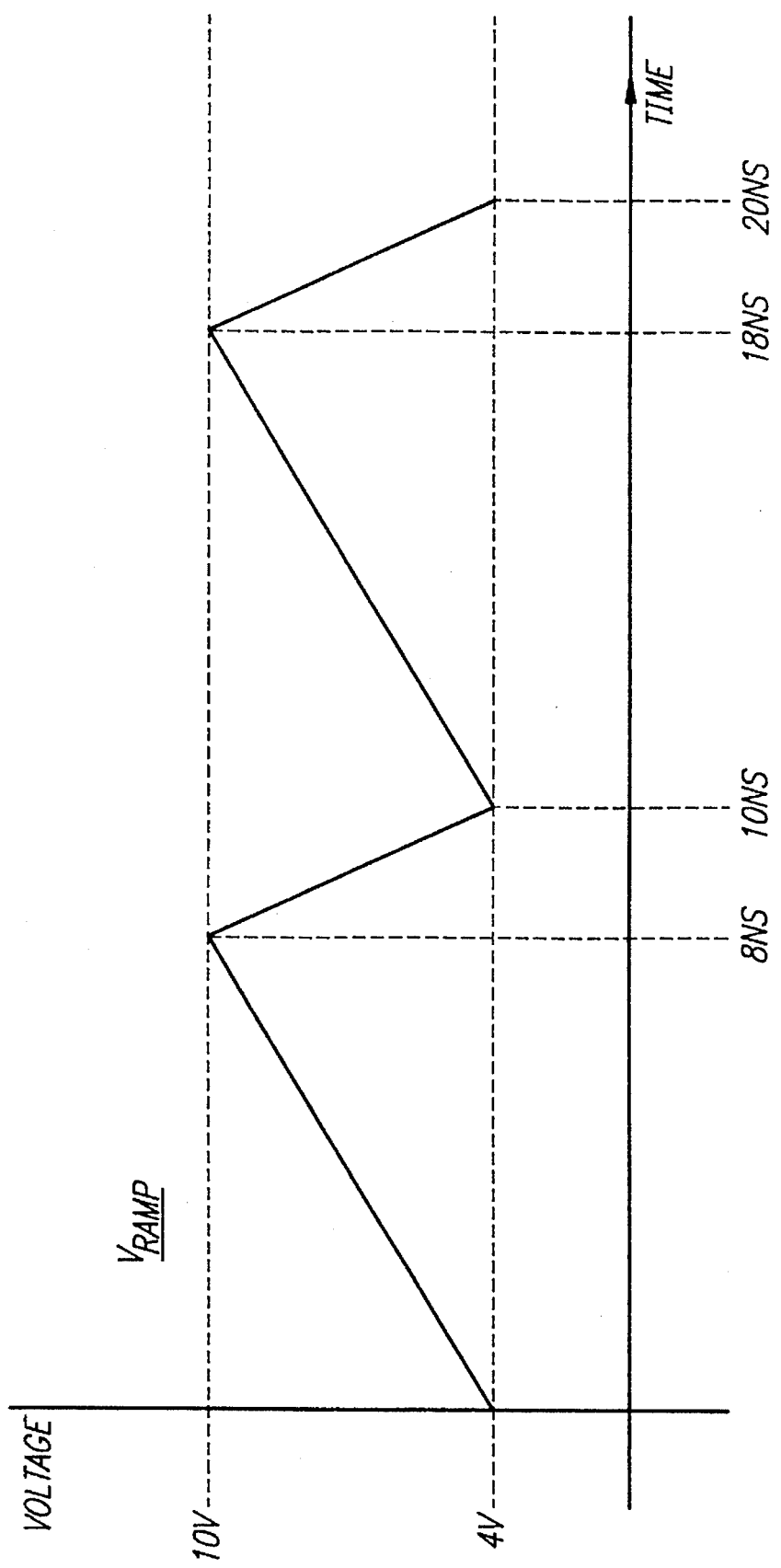
FIG. 4 is a representation of a ramp signal generated by the circuit of FIG. 3, and is identical to FIG. 6 of U.S. Pat. No. 4,677,366.

The pulse width modulator/comparator 302 is also shown in circuit detail in FIG. 3, and it includes an NPN transistor $Q_A$ and an NPN transistor $Q_B$, as well as an NPN transistor $Q_C$ which serves as a current sink. The ramp signal $V_{ramp}$ from the ramp generator 300 is applied to the base of transistor $Q_A$. The wave shape of the ramp signal is shown in FIG. 4. The collector of the transistor is connected to $V_{aux}$, and its emitter is connected to a diode CR400. The emitter of transistor $Q_B$ is connected to a diode CR402, and the diodes are connected to the collector of transistor $Q_C$.

An enable signal is applied to the base of transistor $Q_C$ through resistor R402 and the base is also connected to a grounded resistor R404. The emitter is connected to a grounded resistor R406. The collector of transistor $Q_B$ is connected to a diode CR404 which, in turn, is connected to $V_{aux}$ through a resistor R406, and to the base of transistor $Q_D$ in the gate driver 310 for the power switch FET50.

The output of current regulator amplifier 308 is applied to the base of transistor $Q_B$ in the pulse width modulator/comparator 302. The current regulator amplifier includes an amplifier A400 whose non-inverting input is connected to the output of the switching multiplier 304 through a resistor R410, and to the negative sense signal $I_S$ through a resistor R412. The inverting input terminal of amplifier A400 is connected to a resistor R414 and to the output through a resistor R416 and capacitor C404.

Integrated circuit NE555 operates in known manner to connect terminal 7 to ground when the ramp signal of FIG. 4 reaches a 10-V level and to remove the ground when the ramp signal drops to a 4-V level. During the initial portion of each cycle of the ramp signal of FIG. 4, the ramp signal increases from the 4-V level to the 10-V level as capacitor C400 is charged from $V_{aux}$ through resistors R401, R400. Then, the ramp signal discharges through R400 back to the 4-V level as the integrated circuit applies a ground to terminal 7, at which time the cycle repeats. Accordingly, the ramp signal has a fixed frequency established by the value of capacitor C400.

Pulse width modulator 302 is in reality a comparator, with the ramp signal being applied to one input terminal and with the output from current regulator amplifier 308 being applied to the other input terminal. The comparator is switched from one output state to a second output state when the ramp reaches a threshold established by the output from the current regulator amplifier. The result is a series of output pulses of a constant frequency whose widths are a function of the voltage level of the output of current regulator amplifier 308. The resulting width modulated pulses are applied to the gate of the power switch 50 of FIG. 1, as described above.

Figure 2:
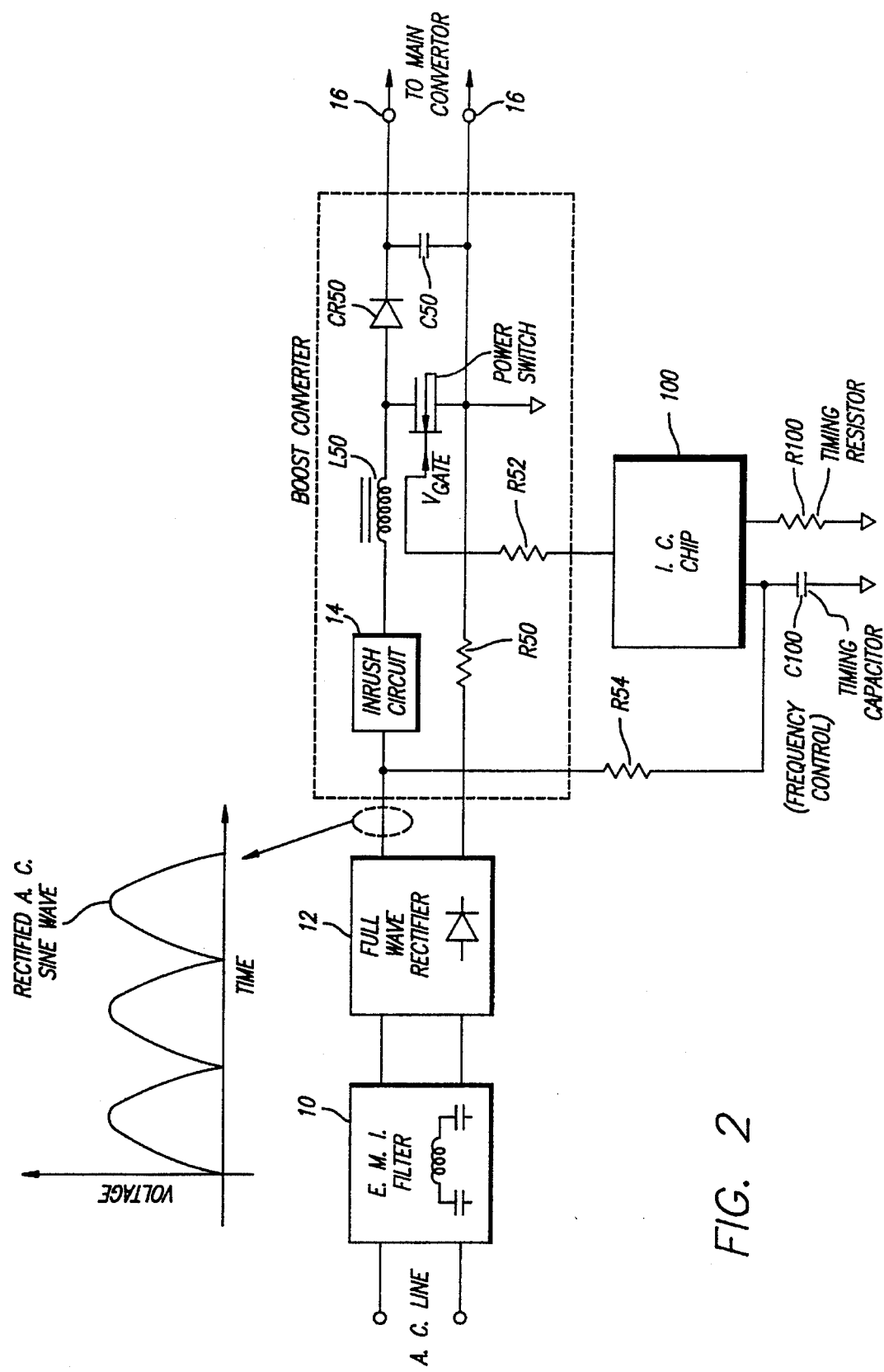
FIG. 2 is a diagram, partly in block form and partly in circuit detail of the unity power factor power supply of FIG. 1 modified in accordance with the present invention to incorporate a circuit for reducing line conducted EMI in the power supply of FIG. 1.

FIG. 2 is a representation of the system of FIG. 1 modified to incorporate the concept of the present invention. In FIG. 2 elements similar to the elements of FIG. 1 have been identified by the same numbers. Also in FIG. 2, the elements 300, 302, 304, 306, 308 and 310 have been incorporated into an integrated circuit chip 100.

The frequency of the ramp signal of FIG. 4 applied to the pulse width modulator/comparator 302 of FIG. 1 is established by timing capacitor C400 in FIG. 3 (corresponding to capacitor C100 in FIG. 2), and resistor R400 in FIG. 3 (corresponding to resistor R100 in FIG. 2). Capacitor C100 and resistor R100 establish the frequency of the width modulated pulse output of pulse width modulator/comparator at a predetermined fixed frequency in the prior art circuit of FIGS. 1 and 3. However, in the system of FIG. 2, the output voltage of the full wave rectifier 12 is introduced through a resistor R54 across the capacitor C100. The waveform of the voltage output of the full wave rectified 12 is shown in FIG. 2, and that waveform causes the frequency of the pulse width modulated output of pulse width modulator/comparator 302 to vary, for example, between frequencies of the order of 40 KHz and 70 KHz.

Specifically, a current proportional to the instantaneous line voltage is injected into the timing capacitor C100 of the pulse width modulator 302. This current speeds up the charging cycle at the line peaks and hence increases the switching frequency.

Accordingly, the circuit described above varies the frequency of the pulse width modulator over a given time period and this serves to reduce the line conducted EMI without having to increase the size of the EMI filter 10 (FIG. 1). This is because the fundamental component of the EMI is spread over a bandwidth wider than the EMI receiver, as explained above, so that the noise energy to the receiver typically is reduced by a factor of 20. The foregoing is achieved by adding a single resistor R54 to the circuit.

The circuit shown in FIG. 2 preserves the simple control loop and continuous power factor corrector current through choke coil L50 of the fixed frequency pulse width modulator of the system of FIG. 1, while providing the noise spreading advantage of the varying pulse factor corrector frequency. Also, this frequency variation may be tailored to operate at lower frequencies at 115 VAC input where the line currents and losses are higher (lower frequency equal lower switch loss); and at higher frequencies at 230 VAC input where EMI restrictions are tightest, for example in Germany, but line currents are lower. Higher frequencies require lower inductances and capacitances to filter out the EMI.

The fixed frequency pulse width modulator power factor corrector system of FIG. 1 has the advantage of a continuous choke current which helps to reduce EMI and increase efficiency by avoiding large peak currents, and it also has the advantage of a simple control loop. However, a disadvantage of the fixed frequency pulse width modulator power factor corrector system is that the power factor corrector ripple must be attenuated by the line EMI filter 10.

As mentioned above, increased switching frequency may be resorted to in order to reduce the filtering requirements of filter 10. However, this represents substantial costs, and substantial increases in switching component losses, and reduced overall efficiency. The circuit of the invention achieves the desired results with minimum cost increase, no increase in switching component losses, and no reduction in overall efficiency.

The frequency variations of the pulse width modulator in the circuit of the invention, can have a dynamic portion varying continuously in order to spread the EMI noise over a wide bandwidth; plus a static change to increase the frequencies where more noise reduction is needed and reduce frequencies where better efficiency is needed. The foregoing is achieved in the embodiment of the invention described above by feeding the continuously varying output from the full wave rectifier 12 through resistor R54 to the timing circuit of the pulse width modulator, namely capacitor C100 and resistor R100, to achieve the desired frequency variation. Also a static voltage is applied through resistor R54 across capacitor C100 depending upon the (A/C) line voltage to achieve a change in frequency so that the system operates at lower frequencies, for example, at 115 VAC input; and at higher frequencies, for example, at 230 VAC input.

Although the frequency varying circuit as shown in FIG. 2 is formed of resistor 54, in conjunction with a voltage source in the form of full wave rectifier 12, the particular combination of the voltage source and resistor may be replaced by a current source to achieve the same purpose.

While a particular embodiment of the invention has been shown and described, modifications may be made. It is intended in the claims to cover all modifications that come within the true spirit and scope of the invention.

I claim:

1. In a converter which includes a rectified alternating-current sine wave voltage source and a pulse width modulator producing a width modulated output and having a timing circuit for establishing the operating frequency of said pulse width modulated output, an electromagnetic interference reduction circuit connected to said timing circuit for introducing a control signal to said pulse width modulator proportional to the voltage of said alternating current voltage source for continuously varying the operating frequency of the pulse width modulated output of said pulse width modulator to increase the frequency of said pulse width modulated output at the peaks of the voltage of said alternating current voltage source so as to spread electromagnetic interference in the converter over a relatively wide band width.

2. In the converter defined in claim 1, in which the pulse width modulator is included in a power factor corrector circuit.

3. In the converter defined in claim 1, in which said timing circuit includes a capacitor.

4. In the converter defined in claim 3, in which said interference reduction circuit comprises a resistor connecting said rectified alternating current sine wave voltage source to said capacitor in said timing circuit for introducing a current proportional to the instantaneous voltage of said source to said capacitor in said timing circuit.

5. In the converter defined in claim 4, in which said rectified alternating current sine wave voltage source comprises a full wave rectifier connected to an alternating current line.

* * * * *